Aug. 10, 1954 P. E. FLENER ET AL 2,685,925
FIXTURE FOR REMOVING BONDED BRAKE LINING FROM BRAKE SHOES
Filed Feb. 9, 1949
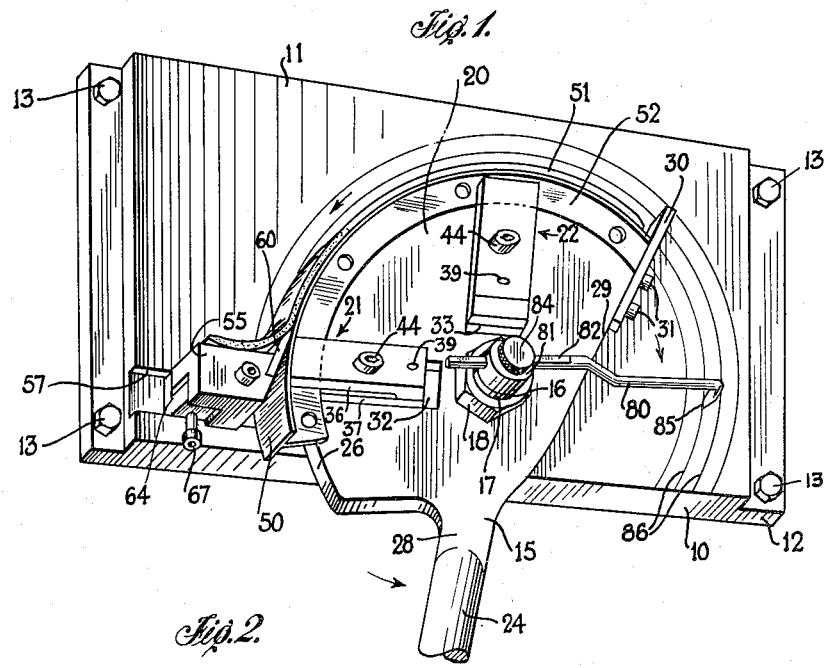
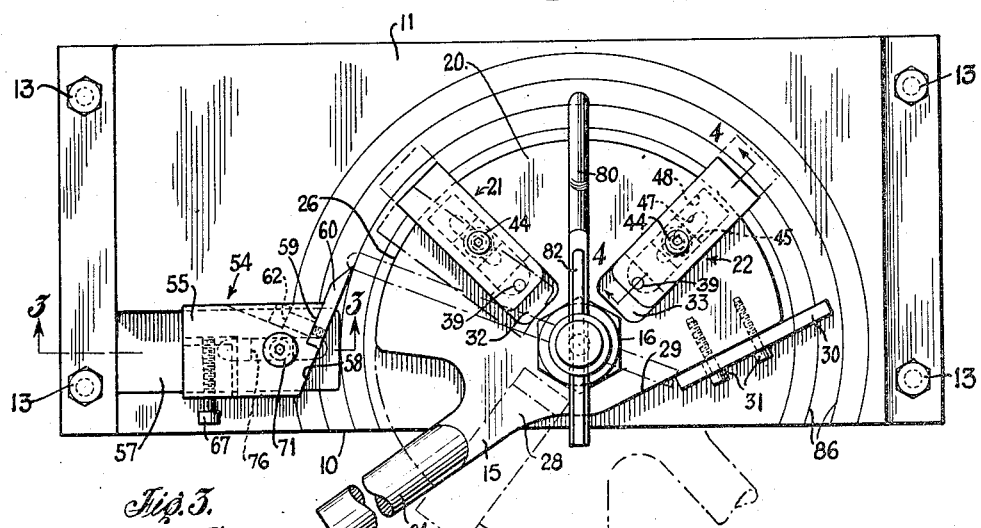
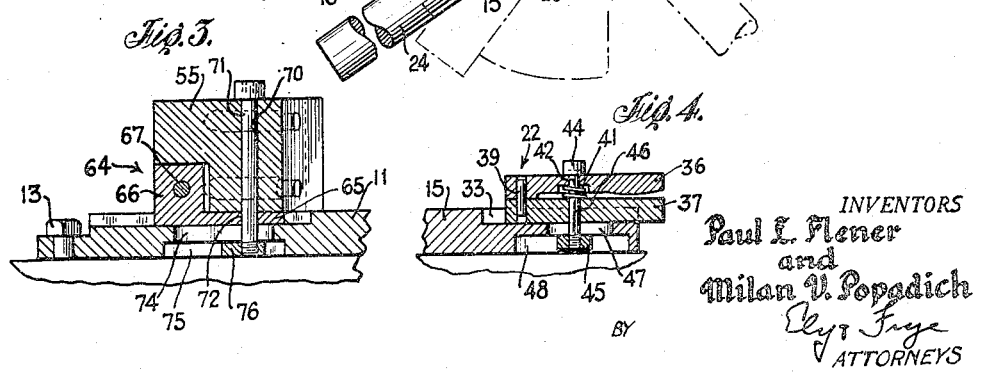
INVENTORS
Paul E. Flener
and
Milan V. Popadich
BY Ely Frye
ATTORNEYS Patented Aug. 10, 1954

2,685,925

UNITED STATES PATENT OFFICE 2,685,925

FIXTURE FOR REMOVING BONDED BRAKE LINING FROM BRAKE SHOES

Paul E. Flener, New Castle, Ind., and Milan V. Popadich, Mogadore, Ohio, assignors to The Firestone Tire & Rubber Company, Akron, Ohio, a corporation of Ohio Application February 9, 1949, Serial No. 75,368

5 Claims. (Cl. 164—38)

This invention relates generally to an improved apparatus adapted for the removal of brake lining from a brake shoe to which the lining has previously been bonded.

A primary object of the invention resides in the provision of a universally adjustable and manually operable mechanism for the rapid removal of ribbon-like brake lining from an arcuate surface of a brake shoe to which it has previously been adhesively bonded.

It is common practice to attach brake lining of the type normally employed in the automobile industry to a brake shoe, for example of the internally expanding type, both by means of a plurality of rivets and by means of an adhesive bonding agent, in the absence of rivets. If rivets are employed, they normally extend through the brake lining with the rivet heads countersunk below the peripheral surface of the lining, and also through a flange-like portion of the brake shoe providing backing support for the lining. During a brake relining operation, it is merely necessary to chisel off these rivets and remove the worn lining preparatory to the application of new lining, and since this operation is a relatively simple one, it is customarily accomplished manually.

The use of adhesive bonding agents has, however, replaced to a large extent the use of rivets since certain advantages reside in the elimination of rivets. For example, wear on the complementary brake drum is reduced, since the lining may be worn practically down to the surface of the shoe without metal-to-metal contact between the shoe and the drum. Adhesive bonding by means of greatly improved bonding agents of the type developed during the last ten years, results in an improved shoe and lining unit resembling integral construction. Riveted lining is maintained in clamped engagement with the shoe only through the immediate area of the rivet heads, hence there is present relative play between portions of the lining and corresponding portions of the shoe which may result, during the normal life of the lining, in a loosening of the rivets and hence a general loosening of the lining upon the shoe.

While it has been generally conceded that a greatly improved bond results from the use of the newly developed adhesive bonding agents rather than rivets for the application of brake lining to brake shoes, a serious disadvantage heretofore resided in the fact that adhesively applied lining was extremely difficult to remove. It is common practice for a workman to clamp the brake shoe in a bench vise and remove the lining bit by bit, by use of a hand chisel and hammer. This work proves both tedious and time-consuming, and since the tool is not always held at a proper angle, it requires frequent sharpening. Since complete relining of passenger automobile brakes requires the removal of lining from eight shoes, the time consumed in the removal of lining, and hence the attendant expense, is considerable.

It is to the relief of this condition that the present invention primarily is directed.

A further object of the invention is to provide an improved manually operable device, readily adjustable for the reception of brake shoes of varying sizes for the rapid alignment and rigid mounting thereof in a manner whereby the entire lining may rapidly be separated from an associated shoe through a simple rotational operation which may be conducted manually.

A still further object of the invention resides in the provision of an apparatus adapted for the rapid removal of brake lining from an associated shoe without injury to the supporting surface of the shoe to which the lining is adhesively bonded.

A still further object resides in the provision of an apparatus of universal application which may be simply but accurately adjusted for removal of the lining from shoes of varying sizes.

Another object of the invention is to provide a simple but rugged brake lining removal apparatus which may be marketed to sell at a price attractive to such customers as small garages and repair shops.

Other objects and advantages are generally to improve and simplify brake lining removing apparatus while effecting the above stated objects. Further objects and advantages will become apparent to persons skilled in the art upon examination of the drawings, the description, and the claims appended thereto.

In the drawings, in which like parts are identified by the same reference numerals, Fig. 1 is a perspective view of a brake lining removing apparatus incorporating the principles of the present invention and illustrating its method of use, with a brake shoe clamped therein and a portion of the lining shown removed from the shoe;

Fig. 2 is a plan view of the device of Fig. 1 but with the brake shoe removed to best illustrate the construction of the apparatus;

Fig. 3 is a fragmentary view in vertical section taken along line 3—3 of Fig. 2; and Fig. 4 is a fragmentary view in vertical section taken along line 4—4 of Fig. 2.

As best shown in Fig. 1, the device includes a base plate 10, preferably of metal such as cast iron or steel but which may be of other material such as hardwood. Base plate 10 provides a generally planate top surface 11 and stepped side margins 12 if desired, to facilitate mounting on the surface of a suitable support member such as a work bench by means of bolts or screws 13. Base plate 10 provides support for the rotational mounting thereon of a manually operable carriage member 15 by means of a suitable pintle 16, the lower end of which is fixed to member 10, in any suitable manner, not shown, to extend vertically therefrom and through a suitable aperture, not shown, provided in carriage 15. Pintle 16 preferably includes an upper shank portion 17, a hexagonal portion 18 for the reception of a wrench, and a lower cylindrical portion of a length substantially equal to the thickness of the carriage member 15 through which the shank portion extends.

The lower cylindrical portion of pintle 16, which provides journaled support for the carriage member 15, leads in turn into a diametrically reduced threaded section adapted for screw-threaded engagement with a suitable internally threaded bore provided in base member 10. The nut 18 permits tightening of the pintle into clamped engagement with base member 10 to a sufficient degree to prevent loosening of the pintle during normal use. The pintle is designed to permit no appreciable axial movement of carriage member 15 between the upper surface 11 of base member 10, and the lower surface of nut 18, between which carriage 15 is confined.

Carriage 15 is preferably constructed of metal, such as steel, but as in the case of base member 10, material such as hard wood may also be employed. In actual practice it has been found desirable to construct base member 10 of cast iron and carriage 15 of a suitable grade of steel. Carriage 15 includes a head portion 20 for the support of clamp units 21 and 22 and a handle portion 24 which may be an integral extension of head portion 20 or detachably engaged in respect thereto. Head portion 20 may be provided with a circular margin 26, preferably extending, in concentric relation to pintle 16, through an arc of approximately 180°. The circular marginal portion of carriage 15 leads at one end into a reduced neck portion 28 of handle 24, and at the other end into a truncated margin 29 leading in a substantially direct path to reduced neck 28. Margin 29 provides support adjacent circular margin 26 for a lug type stop member 30, clamped by Allen head screws 31 to extend outwardly of circular margin 26 a sufficient distance to provide a stop member against which one end of a brake shoe is abutted for the purpose of constraining the shoe against circumferential movement during operation of the apparatus.

Clamp units 21 and 22, the construction of which is best shown in Fig. 4, are identical and are radially disposed, in approximate 90° angularity, in respect to pintle 16. The angular relation of these units is of course not critical, and will depend somewhat upon the most common type of brake shoe to be processed. The most common type of passenger automobile brake shoe extends through an arc of somewhat less than 180° and this type of shoe may be securely supported with the clamping units angularly disposed as shown. Each clamping unit 21 and 22 is partially disposed in upwardly open channels 32 and 33 provided in carriage 15. Referring in detail to the construction of unit 22, Fig. 4, a pair of finger-like clamp elements 36 and 37 are maintained at the radially inward end thereof in pinned engagement by means of a dowel pin 39 pressed into suitably aligned bores. Element 37 presents a planiform surface, while element 36 is provided with a contour surface to provide a channel between the two members into which the inwardly directed mounting flange 52 of the brake shoe is receivable.

A suitable bore is provided in element 36 for a helical spring 41, maintained under compression intermediate elements 36 and 37 to urge element 36 outwardly from element 37 to an extent permitted by a clamping bolt 42, including an Allen type head 44, a shank portion 46 extending through suitable bores provided in elements 36 and 37, and through an elongate slot 47 leading downwardly from slot 33 in carriage 15, into a third elongated slot 48 opening at the lower surface of carriage 15. Slots 47 and 48, in common with slot 33, have longitudinal axes positioned to extend radially in respect to pintle 16. The lower end of bolt 42 is threaded for the reception of a nut 45 of a dimension substantially greater than the width of slot 47 and sufficiently great to prevent rotation of nut 45 within slot 48.

With bolt 42 loosened, radial adjustment of clamp unit 22 is permitted within limits defined by the radial distance of slot 47. With the device designed for use with passenger car size brake linings, slot 47 is of sufficient length to permit universal adjustment within the tolerances of variation normally found in passenger car brake shoes. The construction of clamping unit 21 is of course identical with the construction of clamp unit 22 above described.

With a brake shoe 50 with worn lining 51 to be removed therefrom, maintained clamped on carriage 15 by means of clamp units 21 and 22, carriage 15 and the brake shoe 50 may be rotated about an adjustably positionable knife assembly 54 for the rapid removal of lining from the shoe.

Knife assembly 54 includes a block-like knife supporting member 55 slidably adjustable within a guideway 57 extending longitudinally of base plate 10 as viewed in Figs. 1 and 2. Block 55 is provided with a diagonally disposed surface 58 offset at 59 for the reception of a cutter blade 60 in flush relation thereto, said cutter blade 60 being detachably engageable in respect to block 55 by means of a pair of set screws 62 extending through suitable bores at right angularity to cutter blade 60. Screws 62 threadedly engage cutter blade 60 and are preferably partially countersunk within block 55. Angular adjustment of cutter blade 60, to permit tangential disposition of the blade in respect to the outer surface of brake shoe 50 is effected in the following manner.

A guide member 64 includes a base portion 65 corresponding in thickness to the depth of guideway 57 and complementally receivable therein. Base portion 65 is integral with a rectilinear upper portion 66 provided with a horizontally disposed set screw 67 extending therethrough and adapted to engage block 55. Block 55 is provided with a vertically extending bore 70 for the reception of a set screw 71 extending therethrough, through a registered bore 72 in base portion 65 of block 64, an elongate slot 74 leading downwardly from guideway 57 to base plate 10, and into a lower elongate slot 75 into which slot 74 leads. Slot 75 is of greater width than slot 74 and adapted for the reception of a rectangular nut 76 of greater dimension than the width of slot 74 and of a size to be restrained against turning within slot 75 while permitting, with set screw 71 loosened, adjustment of knife assembly 54 along guideway 57. Since the base of block 55 is supported on the upper face of base 65 of block 64 at the level of the surface of base plate 10, block 55, and hence knife 60, may be rotated about set screw 71 to obtain the desired degree of angularity in respect to the brake shoe 50. Set screw 67, finding its support in slidable but non-rotatable block 64, provides a stop to limit counter-clockwise rotation of block 55. The assembly is so positioned that the cutting edge of blade 60 is in tangential relation to the circumferential surface of brake shoe 50.

As an aid to establishing concentric alignment of brake shoe 50 in respect to pintle 16, an adjustable scribe arm 80 is mounted on pintle 16 for radial adjustment in respect thereto. A cap 81 is mounted for free rotation in respect to pintle 16, and is provided with a diametric bore for the reception of a partially flattened shank portion 82 of scribe arm 80. A set screw 84 is threaded axially into cap 81 to engage the flat of shank 82, set screw 84 being of the knurled knob type to provide rapid manual adjustment of scribe arm 80. Scribe arm 80 is preferably provided with depending pointed end 85 which is shown in registry with one of a plurality of scribe lines 86, provided upon the upper surface of base plate 10 in concentric relation to pintle 16 for the purpose of aiding in the initial visual alignment of brake shoe 50 as hereinafter described.

Operation of the device is as follows. With the brake shoe 50 within the range of sizes receivable upon the device, a rough setting is obtained by disposing the shoe within clamp units 21 and 22 with the shoe 50 in vertical alignment with the scribe lines 86 on base plate 10. With clamp members 21 and 22 temporarily tightened, carriage 15 is rotated to a position whereby the cutter blade 60 may engage the surface of brake shoe 50 beneath the brake lining 51. For this purpose a small portion of the lining may be removed from the shoe or the shoe may be positioned in a manner to allow the knife to engage the shoe surface at the extreme left end thereof as shown in Fig. 1. Both clamping bolts 67 and 71 have been loosened prior to this stage, but upon obtaining the proper adjustment of blade 60, the bolts are tightened in a manner to insure light contact of blade 60 upon the outer surface of brake shoe 50 and in tangential relation thereto. Scribe 80 is then rotated to the vicinity of blade 60 and is readily adjusted with the pointer 85 in vertical registry with the cutter edge of blade 60, and set screw 84 tightened. Since the scribe pointer provides, as it is rotated about pintle 16, an accurate measurement of the radial dimension between the axis of pintle 16 and the cutting edge of blade 60, the scribe is rotated to the opposite end of shoe 50 and with one or both of the clamp assemblies 21 and 22 slightly loosened, the free end of shoe 50 is brought into vertical alignment with the scribe while the opposite end of the shoe is maintained in light engaging contact with blade 60. Clamp assemblies 21 and 22 are then securely tightened. The device is now ready for manual rotation, in a counter-clockwise direction as viewed in the drawings, for the rapid removal of lining 51 from shoe 50.

Since the scribe does not require re-setting for subsequent shoes of the same circumferential arc, a complete set of brake linings may rapidly be removed from their shoes in the manner above described.

What is claimed is:

1. Apparatus for removing brake lining from arcuate shoes comprising a rotatable carriage having a circular edge portion defining an arc of not over 180°, means for mounting a shoe in detachable clamped engagement with said edge portion, a knife blade having means for adjustably mounting said knife blade in a position tangent to the edge of said shoe mounted on the carriage and means to lock said knife blade in said position, lug stop means extending outwardly of said edge portion, and a handle integral with said carriage whereby said carriage is rotatable to permit said blade to peel said brake lining from said shoe.

2. In a device of the character described, a base plate, a pintle member supported by said base plate to extend perpendicularly therefrom, a carriage having a circular edge portion defining an arc of not over 180° supported by said pintle member for rotation with respect to said base plate, stop lug means at one end of and extending outwardly from said circular edge portion, handle means integral with said carriage, means for clamping a brake shoe to said edge portion in a position concentric with said pintle member, and knife means mounted on said base plate, with a blade tangent to the edge of said brake shoe said knife means being mounted on a knife holder adapted to have sliding movement in a groove extending toward said pintle, said knife holder comprising a pair of block members rotatable with respect to each other, and means to lock said knife holder in a said groove and to lock said knife member holder against rotation.

3. In apparatus for removing brake lining from arcuate shoes, the combination comprising a base plate, a carriage having a circular edge defining an arc not over 180° rotatably mounted in respect to said plate, means for clamping a brake shoe to said edge, knife means with a blade tangent to the edge of said brake shoe mounted on said plate and adjustable radially of the axis of said carriage, means to lock said knife means in position, stop lug means at one end of and extending outwardly from said circular edge, and a handle integral with said carriage whereby said carriage is rotatable with respect to said knife means.

4. In apparatus for removing brake lining from arcuate shoes, the combination comprising a base plate, a carriage having a circular edge defining an arc not over 180° rotatably mounted in respect to said plate, means for clamping a brake shoe to said edge, knife means with a blade tangent to the edge of said brake shoe mounted on said plate and adjustable radially of the axis of said carriage, means to lock said knife means in position, stop lug means at one end of and extending outwardly from said circular edge, and a handle on said carriage whereby said carriage is rotatable with respect to said knife means.

5. Apparatus for removing brake lining from arcuate shoes comprising a rotatable carriage having a circular edge portion defining an arc of not over 180°, means for mounting a shoe in detachable clamped engagement with said edge portion, a knife blade having means for adjustably mounting said knife blade in a position tangent to the edge of said shoe mounted on the carriage and means to lock said knife blade in said position, lug stop means extending outwardly of said edge portion and a handle on said carriage whereby said carriage is rotatable to permit said blade to peel said brake lining from said shoe.

References Cited in the file of this patent

UNITED STATES PATENTS

| Number | Name | Date |
|---|---|---|
| 30,736 | Keen | Nov. 27, 1860 |
| 100,771 | Kavanagh | Mar. 15, 1870 |
| 397,181 | Gorham | Feb. 5, 1889 |
| 442,399 | Safford | Dec. 9, 1890 |
| 1,515,636 | Wagner | Nov. 18, 1924 |
| 1,609,514 | Kimmerling | Dec. 7, 1926 |
| 1,653,104 | Kimmerling | Dec. 20, 1927 |
| 1,723,356 | Knowles | Aug. 6, 1929 |
| 2,346,932 | Mays | Apr. 18, 1944 |
| 2,358,483 | Tilden | Sept. 19, 1944 |
| 2,359,677 | Reeves | Oct. 3, 1944 |